United States Patent [19]

Nakai et al.

[11] Patent Number: 5,033,588
[45] Date of Patent: Jul. 23, 1991

[54] APPARATUS FOR MAINTAINING AN AIR GAP IN A TOROIDAL LINEAR MOTOR

[75] Inventors: Keiichiro Nakai, Tokyo; Yoshinori Nakanishi, Shibayama, both of Japan

[73] Assignee: Otis Elevator Company, Farmington, Conn.

[21] Appl. No.: 494,046

[22] Filed: Feb. 26, 1990

[30] Foreign Application Priority Data

Feb. 28, 1989 [JP] Japan .................. 1-49723

[51] Int. Cl.⁵ .................. H02K 5/24
[52] U.S. Cl. .................. 187/95; 187/17; 187/112; 318/135
[58] Field of Search .................. 187/17, 112, 94, 95; 318/135

[56] References Cited

U.S. PATENT DOCUMENTS 2,483,895  10/1949  Fisher .................. 318/135
2,640,955  6/1953  Fisher .................. 318/135

FOREIGN PATENT DOCUMENTS 3634061  4/1988  Fed. Rep. of Germany .................. 187/17
0051163  4/1979  Japan .................. 187/17

Primary Examiner—David H. Bollinger
Assistant Examiner—S. Kennemore
Attorney, Agent, or Firm—Lloyd D. Doigan

[57] ABSTRACT

An apparatus for maintaining an air gap between a stationary and a moving element of a toroidal linear motor which provides motive force to an elevator, comprises; a plurality of rollers mounted upon the moving element, and a means for biasing the rollers towards a central axis of the stationary element, and for cooperating with the rollers to maintain the air gap when power to the motor is shut off or vibration or other forces would tend to lessen the gap below a predetermined minimum. The rollers are arranged angularly about the stationary element and rotate due to the relative rotation of the moving and stationary elements.

4 Claims, 3 Drawing Sheets

FIG.2
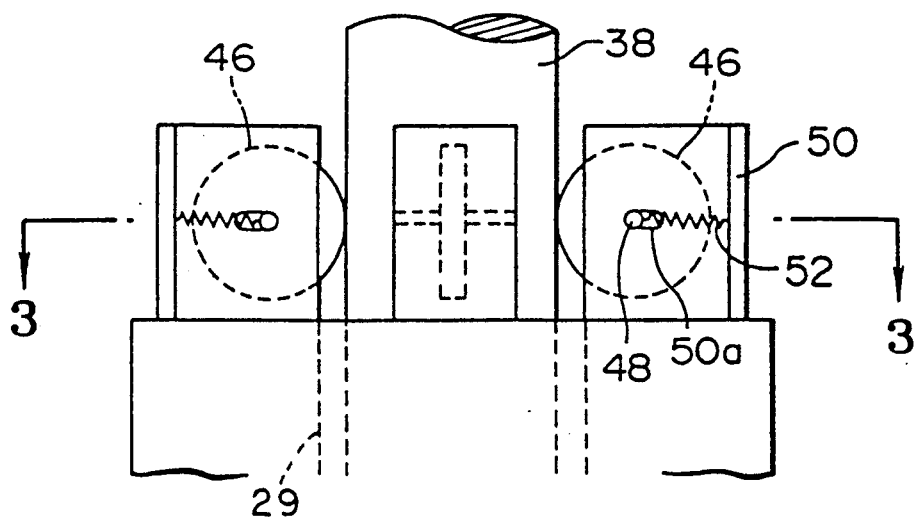
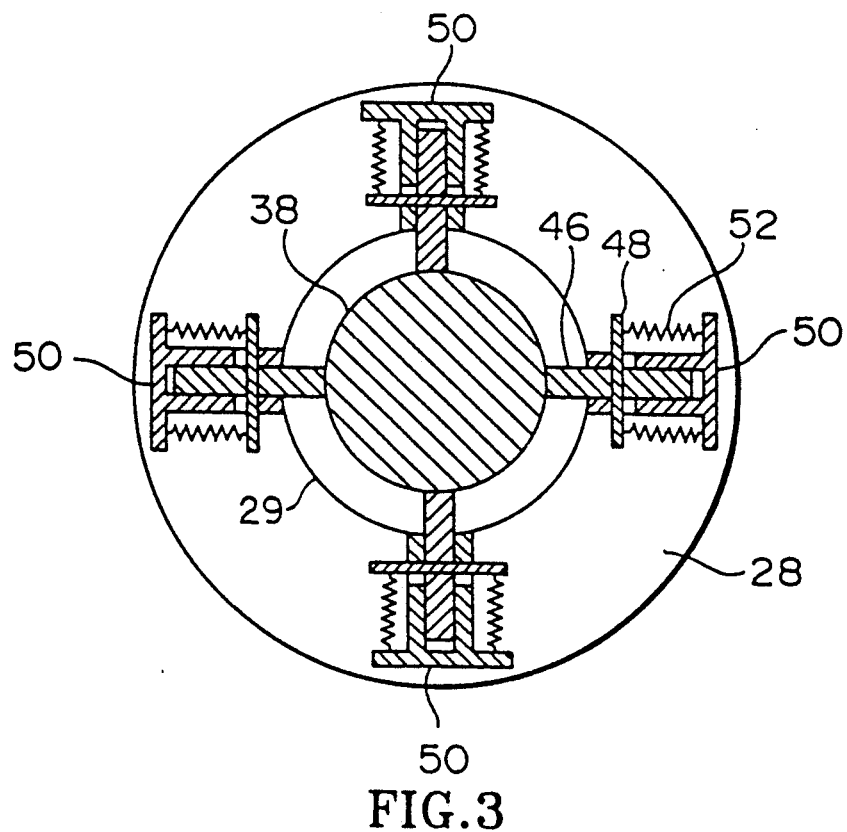
FIG.3

APPARATUS FOR MAINTAINING AN AIR GAP IN A TOROIDAL LINEAR MOTOR

DESCRIPTION

1. Technical Field

The present invention relates to an apparatus for maintaining an air gap in a toroidal linear motor.

2. Background Art

Toroidal linear motors comprise a moving element having a cylindrical opening and a stationary element passing through such opening. A predetermined annular air gap is maintained between the stationary and moving elements due to magnetic forces produced therebetween.

Elevators driven by a toroidal linear motor utilize a vertically extending column fixed to a building as a stationary element. The moving element is generally incorporated in a counterweight or an elevator car which moves vertically about the stationary element.

Ropes, which are guided by sheaves disposed atop an elevator hoistway, connect at one end thereof to the counterweight and at another end thereof to the elevator car. While the elevator car moves up and down, substantially even magnetic forces between the column and the moving element maintain a predetermined air gap therebetween. However, when the elevator car is stopped, no magnetic force is exerted between the column and the moving element, so that the air gap may not be maintained. Further, if an impact or vibration is applied to the column, the air gap may not be maintained. Therefore, in some elevators, a plurality of rollers are rotatably fixed to the top and bottom surfaces of the moving element, the rollers rotating and moving on the column to maintain the predetermined air gap.

However, in such elevators, noise tends to occur due to rotation of the rollers as the elevator moves. Particularly, since the column is formed of a plurality of sections connected to each other, noise tends to occur as a roller passes over the connecting joints. The noise may be uncomfortable to elevator car passengers.

DISCLOSURE OF THE INVENTION

It is an object of the present invention to provide an apparatus for maintaining an air gap in a toroidal linear motor.

It is a further object of the invention to provide an apparatus for maintaining an air gap in a toroidal linear motor while minimizing noise as the elevator car moves upwardly and downwardly.

According to the invention, an apparatus for maintaining an air gap between a stationary and a moving element of a toroidal linear motor which provides motive force to an elevator, comprises; a plurality of rollers mounted upon the moving element, and means for biasing the rollers towards a central axis of the stationary element, and for cooperating with the rollers to maintain the annular air gap when power to the motor is shut off or vibration or other forces would tend to lessen the gap below a predetermined minimum The rollers are arranged angularly about the stationary element and rotate due to the relative rotation of the moving and stationary elements.

According further to the invention, an apparatus for maintaining a predetermined annular air gap between a stationary and moving element is provided, the apparatus comprising a plurality of elastic rollers rotatably mounted upon the moving element The elastic rollers, made of a synthetic resin, are so arranged as to come into contact with the stationary element to maintain the annular air gap.

These and other objects of the present invention will become more apparent in light of the detailed description of a best mode embodiment thereof, as illustrated in the accompanying drawing.

BRIEF DESCRIPTION OF THE DRAWING

FIG. 2 is a plan view illustrating a first preferred embodiment of an apparatus for maintaining a air gap in a driven elevator of FIG. 1;

FIG. 3 is a sectional view taken along the line 3—3 of FIG. 3;

BEST MODE FOR CARRYING OUT THE INVENTION

Figure 1:
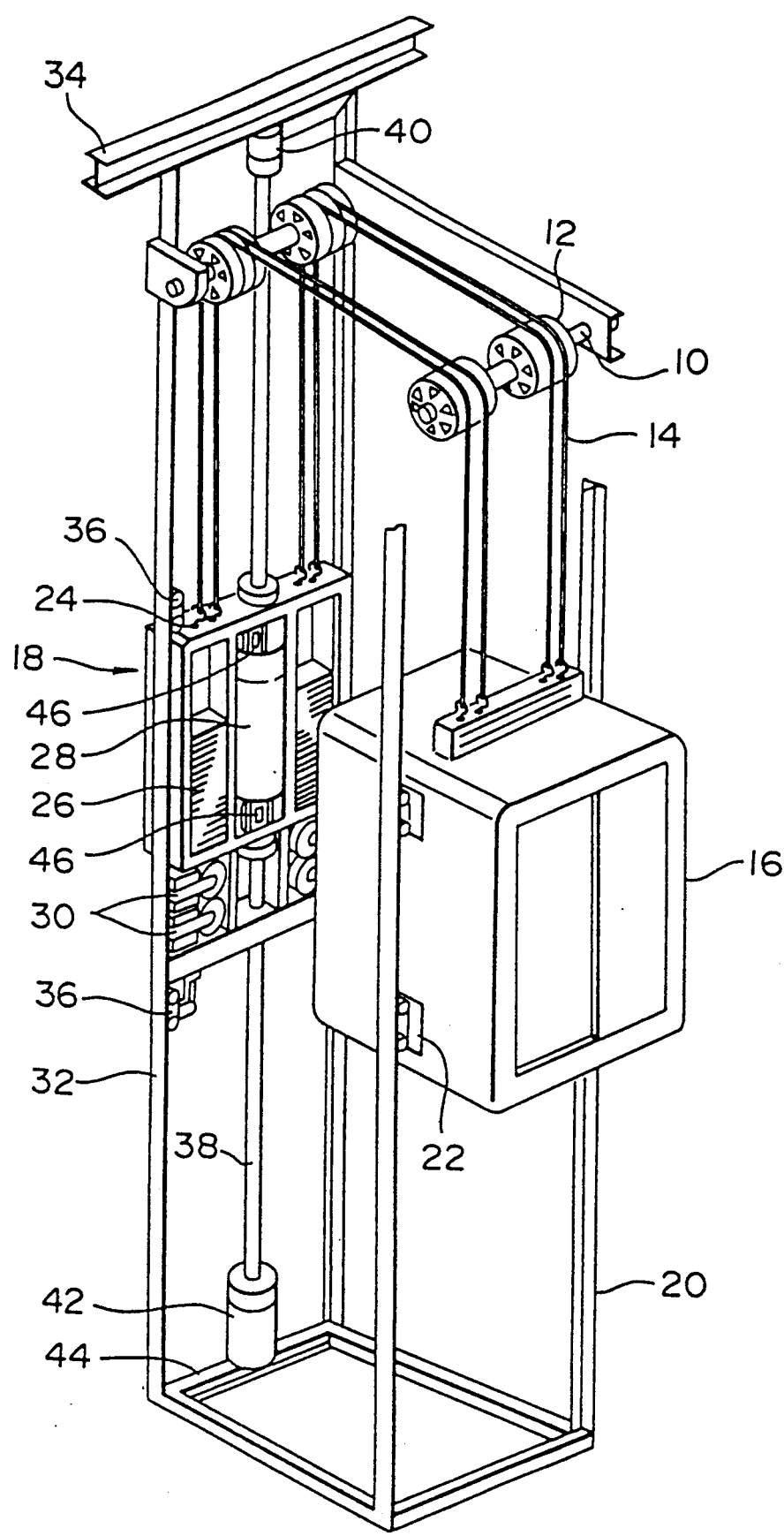
FIG. 1 is a perspective view of an elevator driven by a linear motor, according to the present invention.

Referring to FIG. 1, an elevator driven by a linear motor is shown. A pair of parallel support shafts 10 are arranged on an upper portion of a building (not shown) Each of the support shafts 10 is provided when a pair of rotatable sheaves 12. Ropes 14 are guided by the sheaves. One end of each rope 14 is connected to an elevator car 16 and the other end thereof is connected to a counterweight 18. When the elevator car 16 moves upwardly, the counterweight moves downwardly, and when the elevator car 16 moves downwardly, the counterweight moves upwardly.

A pair of guide rails 20, which are fixed to the building in parallel to each other, are disposed on both sides of the elevator car. The elevator car is guided therealong via sliding members 22 disposed on the elevator car 16.

The counterweight 18 has a rectangular frame 24 and a plurality of weights 26 supported thereon The frame also supports a moving element 28 of a toroidal linear motor and a braking device 30. The total weight of the counterweight is usually one and one half times that of the elevator car 16.

A pair of guide rails 32 are disposed in parallel to each other on either side of the counterweight 18. The top end of each guide rail 32 is fixed to a top supporting channel 34. The bottom end of each guide rail is fixed to a supporting channel 44. Sliding members 36 are provided on the counterweight 18 to guide the counterweight along guide rails 32.

A toroidal linear motor, which serves as a driving source of the elevator, is comprised of a stationary element formed of an aluminum alloy column 38, which serves as a secondary conductor, and the moving element 28, which serves as a primary conductor. Column 38 hangs vertically from supporting channel 34 via supporting member 40 and is attached to supporting member 44 via support member 42.

Referring to FIGS. 2-5, the moving element 28 has a cylindrical opening 29 which receives the column 38 therein. As is known, a predetermined annular air gap is formed between the stationary and moving elements due to the magnetic forces produced therebetween. As such, the moving element 28 is designed to move vertically, during normal operation, to maintain the predetermined air gap between the outer surface of the column 38 and the inner surface of the opening 29. When even magnetic forces are not exerted between the column and the moving element 28, or when an impact or vibration is applied to the column 38, or the power to the linear motor is shut off, the distance between the moving element 28 and the stationary element may diminish so that the predetermined air gap may not be maintained. In order to maintain the predetermined air gap, four rollers 46 are provided on the top and the bottom of the moving element 28. The rollers are provided angularly about the column. One of ordinary skill will appreciate that the disposition of the rollers on the bottom of the moving element 28 is identical to the rollers on the top of the moving element.

Each of the rollers 46 are rotatably supported on a shaft 48. The shaft is disposed within an elongated slot 50A of a support member 50. The support member 50 projects from the top or bottom surface of the moving element 28. The support member 50 comprises a pair of side walls in parallel to each other, and a rear wall extending perpendicularly to each side wall. The roller is mounted about the shaft between the side walls. A pair of springs 52 are provided between the rear wall of the supporting member 50A and the supporting shaft 48, so that the supporting shaft 48 and the roller are biased by the spring in a radial direction toward a stationary axis of the column 38. Therefore, it is possible to minimize the change in the dimension of the air gap when no magnetic force is exerted between the moving element 28 and the column 38, or When an impact, vibration or the like is applied to the column The spring exerts a force upon the column to minimize the displacement thereof. At any rate, the rollers may not be displaced more than the length of the slot so a predetermined minimum air gap may be maintained. The arrangement minimizes vibration of the column and noise produced by rotation of the roller when the elevator car moves upward and downward because the springs absorb such vibrations.

Figure 4:
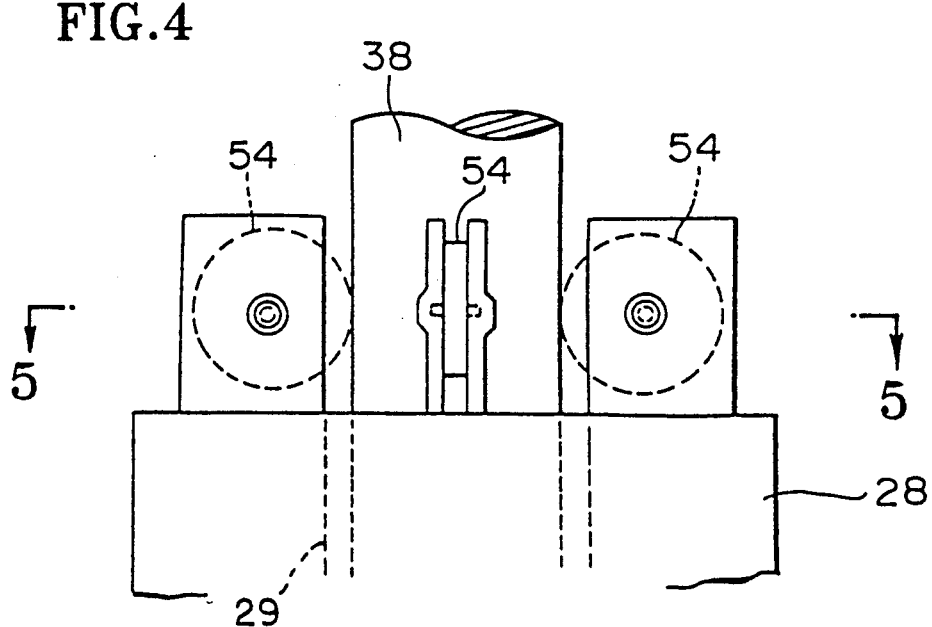
FIG. 4 is a second preferred embodiment of an apparatus for maintain an air gap in a linear motor driven elevator of FIG. 1; and, FIG. 5 is a sectional view taken along the line 5—5 of FIG. 4.
Figure 5:
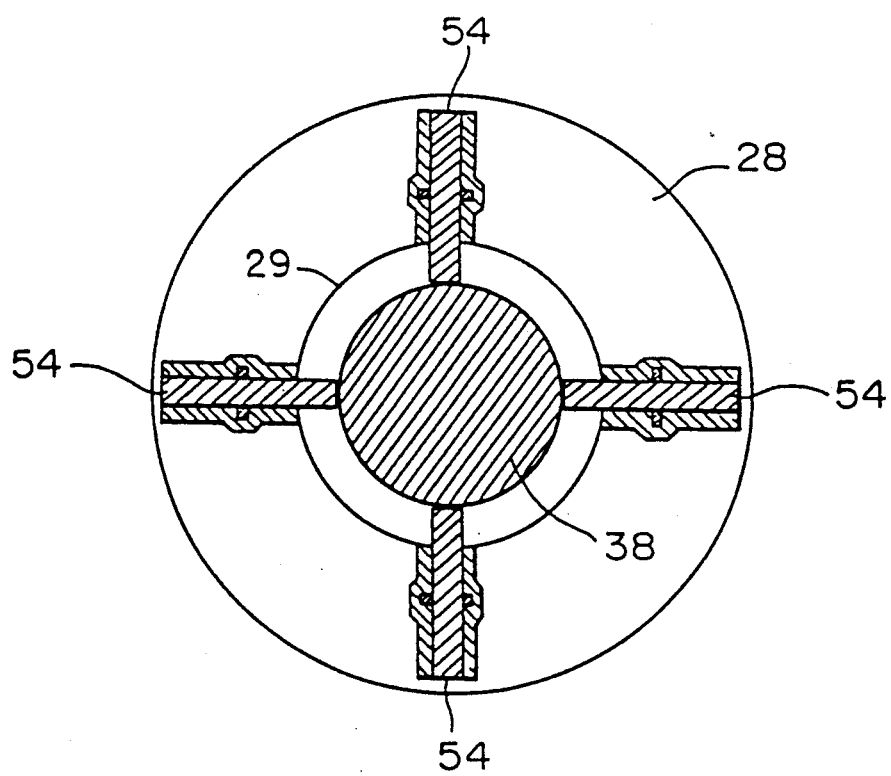

Referring to FIGS. 4 and 5, a second embodiment of an apparatus for adjusting an air gap in a toroidal linear motor is shown. Elastic rollers 54 are made of a suitable synthetic resin which are substituted for the rollers 46 and the spring 52. It will be appreciated by one of ordinary skill, that the air gap will not be diminished beyond an amount of deformation of the rollers 54.

As set forth above, the elastic rollers minimize the change to the air gap when no magnetic force is exerted between the moving element in the column, or when an impact, or vibration is applied to the column, and to decrease vibration of the column and noise produced by rotation of the roller when the elevator car moves upwardly and downwardly because of the damping effect provided by the elastic rollers.

Although the invention has been shown and described with the respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for maintaining a predetermined air gap in a toroidal linear motor, said motor having a moving element having an opening passing therethrough and a stationary element passing through said opening, said stationary element having an axis, said motor having an air gap between said stationary and said moving element, said apparatus comprising;

a plurality of rollers affixed to said moving element about said stationary element, means for supporting said rollers for movement radially inwardly and outwardly in relation to a radius extending from said axis of said stationary element, and for preventing one of said moving element or said stationary element from moving toward or away from the other of said moving element or said stationary element such that said air gap is not less than said predetermined air gap, and means for biasing said rollers into contact with said stationary element.

2. Apparatus for maintaining a predetermined air gap in a toroidal linear motor, said motor having a moving element having an opening passing therethrough and a stationary element passing through said opening said stationary element having an axis, said motor having an air gap between said stationary and said moving element, said apparatus comprising;

a plurality of rollers affixed to said moving element about said stationary element, means for biasing said rollers into contact with said stationary element, said means for biasing damping vibrations and noise in the column.

3. Apparatus of claim 2 further comprising;

means for supporting said rollers for movement radially inwardly and outwardly in relation to a radius extending from said axis of said stationary element, and for preventing one of said moving element or said stationary element from moving toward or away from the other of said moving element or said stationary element such that said air gap is not less than said predetermined air gap.

4. Apparatus for maintaining a predetermined air gap in a toroidal linear motor, said motor having a moving element having an opening passing therethrough and a stationary element passing through said opening said stationary element having an axis, said motor having an air gap between said stationary and said moving element, said apparatus comprising;

a plurality of elastic rollers affixed to said moving element about said stationary element, said elastic rollers being disposed in contact with said stationary member to maintain said predetermined air gap, said elastic rollers damping vibration and noise is said column.

* * * * *